United States Patent
Mayo et al.

(10) Patent No.: US 12,105,976 B2
(45) Date of Patent: Oct. 1, 2024

(54) JOURNALS FOR DATA CLONING OPERATIONS

(71) Applicant: HEWLETT PACKARD ENTERPRISE DEVELOPMENT LP, Houston, TX (US)

(72) Inventors: Richard Phillip Mayo, Bristol (GB); David Malcolm Falkinder, Bristol (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 473 days.

(21) Appl. No.: 17/303,796

(22) Filed: Jun. 8, 2021

(65) Prior Publication Data
US 2022/0391118 A1    Dec. 8, 2022

(51) Int. Cl.
*G06F 3/06* (2006.01)

(52) U.S. Cl.
CPC .......... *G06F 3/0641* (2013.01); *G06F 3/0604* (2013.01); *G06F 3/065* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | |
|---|---|---|
| 9,395,936 B2 | 7/2016 | Sakata |
| 9,846,555 B2 | 12/2017 | Inoue et al. |
| 10,437,681 B2 | 10/2019 | Balcha et al. |
| 2005/0165865 A1* | 7/2005 | Farmer ............... G06F 11/1471 707/999.203 |
| 2016/0224588 A1* | 8/2016 | Harijono ............... G06F 16/174 |
| 2017/0083540 A1* | 3/2017 | Mamluk ............. G06F 11/1471 |
| 2017/0177266 A1 | 6/2017 | Doerner et al. |
| 2017/0308305 A1* | 10/2017 | Goel ..................... G06F 3/0641 |
| 2019/0057004 A1* | 2/2019 | Tripathi ............... G06F 3/0689 |
| 2019/0129806 A1 | 5/2019 | Hsu et al. |
| 2019/0286728 A1* | 9/2019 | Markiewicz ........ G06F 16/1815 |
| 2020/0372005 A1* | 11/2020 | Apte .................... G06F 16/2272 |

OTHER PUBLICATIONS

Lillibridge et al (Spare Indexing: Large Scale, Inline Deduplication Using Sampling and Locality, 7th USENIX Conference on File and Storage Technologies, 2009 (Year: 2009).*
Hitachi; "Universal Replicator overview—Hitachi Vantara Knowledge"; Aug. 18, 2020; 18 pages.
Ni, F. et al.; "WOJ: Enabling Write-Once Full-data Journaling in SSDs by Using Weak-Hashing-based Deduplication"; Sep. 17, 2018; 20 pages.

* cited by examiner

*Primary Examiner* — Khoa D Doan
*Assistant Examiner* — Edmund H Kwong
(74) *Attorney, Agent, or Firm* — Trop, Pruner & Hu, P.C.

(57) ABSTRACT

Example implementations relate to journals for metadata changes. An example includes detecting, by a storage controller of a deduplication storage system, a cloning operation of a manifest range; loading a journal from persistent storage into memory in response to the detected cloning operation, wherein the journal is to store changes to a container index associated with the manifest range, and wherein the container index is not loaded into the memory in response to the detected cloning operation; and updating the journal in the memory to include an indication of changes to metadata of the container index that is not loaded into the memory, wherein the changes to the metadata are associated with the detected cloning operation.

20 Claims, 8 Drawing Sheets

| Manifest ID | Unit Address | Length | Ref. Count |
|---|---|---|---|
| ---- | ---- | ---- | ---- |
| ---- | ---- | ---- | ---- |
| ---- | ---- | ---- | ---- |

— 327

JOURNALS FOR DATA CLONING OPERATIONS

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

Figure 1:
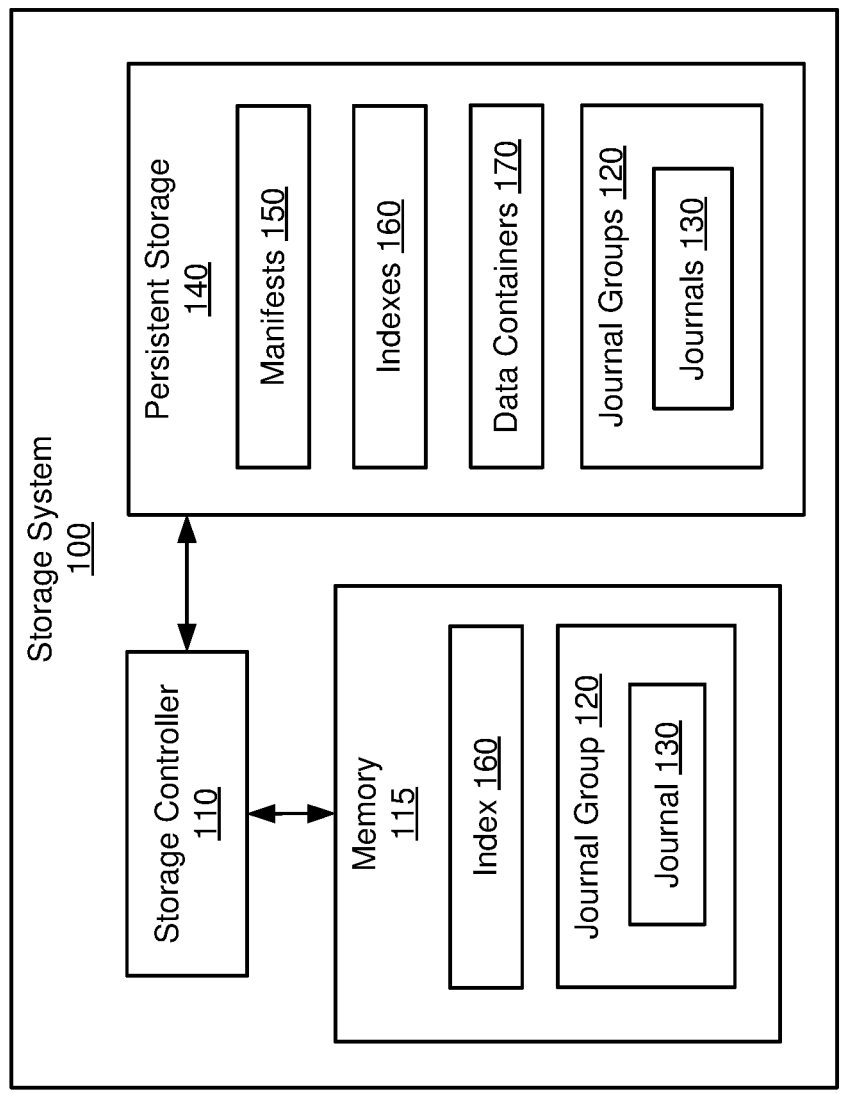
FIG. 1 is a schematic diagram of an example system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may deduplicate data to reduce the amount of space required to store the data. The storage system may perform a deduplication process including breaking a stream of data into discrete data units or "chunks." Further, the storage system may determine identifiers or "fingerprints" of incoming data units, and may determine which incoming data units are duplicates of previously stored data units. In the case of data units that are duplicates, the storage system may store references to the previous data units instead of storing the duplicate incoming data units.

As used herein, the term "fingerprint" refers to a value derived by applying a function on the content of the data unit (where the "content" can include the entirety or a subset of the content of the data unit). An example of the function that can be applied includes a hash function that produces a hash value based on the incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use stored metadata for processing and reconstructing the original data stream from the stored data units. In this manner, the deduplication process may avoid storing duplicate copies of repeated data units, and thereby may reduce the amount of space required to store the stream of data. In some examples, the deduplication metadata may include data recipes (also referred to herein as "manifests") that specify the order in which particular data units were received (e.g., in a data stream). In order to retrieve the stored data (e.g., in response to a read request or a cloning request), the deduplication system may use a manifest to determine the received order of data units, and can thereby recreate the original data stream. The manifest may include a sequence of records, with each record representing a particular set of data unit(s). The records of the manifest may include one or more fields (also referred to herein as "pointer information") that identify indexes that include storage information for the data units. For example, the storage information may include one or more index fields that specify location information (e.g., containers, offsets, etc.) for the stored data units, compression and/or encryption characteristics of the stored data units, and so forth. In some examples, the manifests and indexes may each be read in addressable portions of fixed sizes (e.g., 4 KB portions).

A "cloning" operation can refer to the process of creating a copy of a particular data stream stored in the deduplication storage system. For example, a cloning operation may include loading a source manifest for the particular data stream into memory, and identifying a set of indexes based on the source manifest. Each identified index is loaded into memory as a whole unit, is decompressed, and is deserialized. The index may then be updated to indicate the reference counts of the cloned data units (i.e., the number of instances that the data unit appears in manifests), and may be written from memory to persistent storage. The new manifest (i.e., representing the cloned data) may be formed from the components of the source manifest. However, in some examples, the cloning operation may have only affected a relatively small portion of the index (e.g., ten records out of ten thousand records in the index) while the index was loaded in memory. Therefore, in such examples, loading the entire index in memory may consume more system processing time and bandwidth than loading just the changed portion into memory.

In accordance with some implementations of the present disclosure, a deduplication storage system may perform a cloning operation by loading journals into memory, but without loading the associated indexes. Each journal may store just information indicating changes to data stored in a corresponding index, and may thereby be relatively smaller than the corresponding index. Further, the journal may include a data structure (referred to herein as a "cloning data structure") that is dedicated for recording metadata changes associated with cloning operations. The cloning data structure may accumulate these changes until a triggering event (e.g., when the journal becomes full), and may be used to update the corresponding index during a single load into memory. Thus, because each journal is smaller than the corresponding index, performing a cloning operation using journals may consume relatively less processing time and bandwidth than would be required if using the corresponding indexes. Accordingly, the disclosed technique for cloning operations may significantly improve the performance the deduplication storage system.

1. Example Storage System

FIG. 1 shows an example of a storage system 100 that includes a storage controller 110, memory 115, and persistent storage 140, in accordance with some implementations. As shown, the persistent storage 140 may include any number of manifests 150, indexes 160, and data containers 170. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM).

In some implementations, the storage system 100 may perform deduplication of stored data. For example, the storage controller 110 may divide a stream of input data into data units, and may store at least one copy of each data unit in a data container 170 (e.g., by appending the data units to the end of the container 170). In some examples, each data container 170 may be divided into portions (also referred to herein as "entities").

In one or more implementations, the storage controller 110 may generate a fingerprint for each data unit. For example, the fingerprint may include a full or partial hash value based on the data unit. To determine whether an incoming data unit is a duplicate of a stored data unit, the storage controller 110 may compare the fingerprint generated for the incoming data unit to the fingerprints of the stored data units. If this comparison results in a match, then the storage controller 110 may determine that a duplicate of the incoming data unit is already stored by the storage system 100.

As shown in FIG. 1, the persistent storage 140 may store manifests 150, indexes 160, data containers 170, and journal groups 120. In some implementations, the storage controller 110 may generate a manifest 150 to record the order in which the data units were received. Further, the manifest 150 may include a pointer or other information indicating the index 160 that is associated with each data unit. In some implementations, the associated index 160 may indicate the location in which the data unit is stored. For example, the associated index 160 may include information specifying that the data unit is stored at a particular offset in an entity, and that the entity is stored at a particular offset in a data container 170.

In some implementations, the storage controller 110 may receive a read request to access the stored data, and in response may access the manifest 150 to determine the sequence of data units that made up the original data. The storage controller 110 may then use pointer data included in the manifest 150 to identify the indexes 160 associated with the data units. Further, the storage controller 110 may use information included in the identified indexes 160 to determine the locations that store the data units (e.g., data container 170, entity, offsets, etc.), and may then read the data units from the determined locations.

In some implementations, a journal 130 may be associated with each index 160. The journal 130 may include information indicating changes to the data stored in the index 160. For example, when a copy of the index 160 present in memory 115 is modified to reflect a change to the metadata, that change may also be recorded as an entry in the associated journal 130. In some implementations, multiple journals 130 may be grouped in a journal group 120 associated with a single file or object stored in the deduplication system. For example, the multiple journals may correspond to indexes storing metadata associated with a single file.

In some implementations, the storage controller 110 may receive a request to perform a cloning operation of a source manifest 150. The cloning operation may include creating a new manifest (also referred to as a "clone manifest") that duplicates all or a portion of the source manifest 150 at a particular point in time. Therefore, the clone manifest may be used to generate a copy of the sequence of data units at the particular point in time. For example, the clone manifest may be used to provide a backup copy of the sequence of data units as of a specific date.

In one or more implementations, during a cloning operation of a manifest portion, the storage system 100 loads journals 130 associated with the manifest portion in the memory 115, but does not load the indexes 160 associated with the manifest portion in the memory 115. In some implementations, each journal 130 may include a cloning data structure (not shown in FIG. 1) that is dedicated for recording metadata changes associated with the cloning operation for the manifest portion. The cloning data structure may accumulate these metadata changes, and may subsequently be used to update the corresponding index 160 to reflect the same metadata changes. The use of the journal 130 during cloning operations is discussed further below with reference to FIGS. 2-7.

2. Example Data Structures

Figure 2:
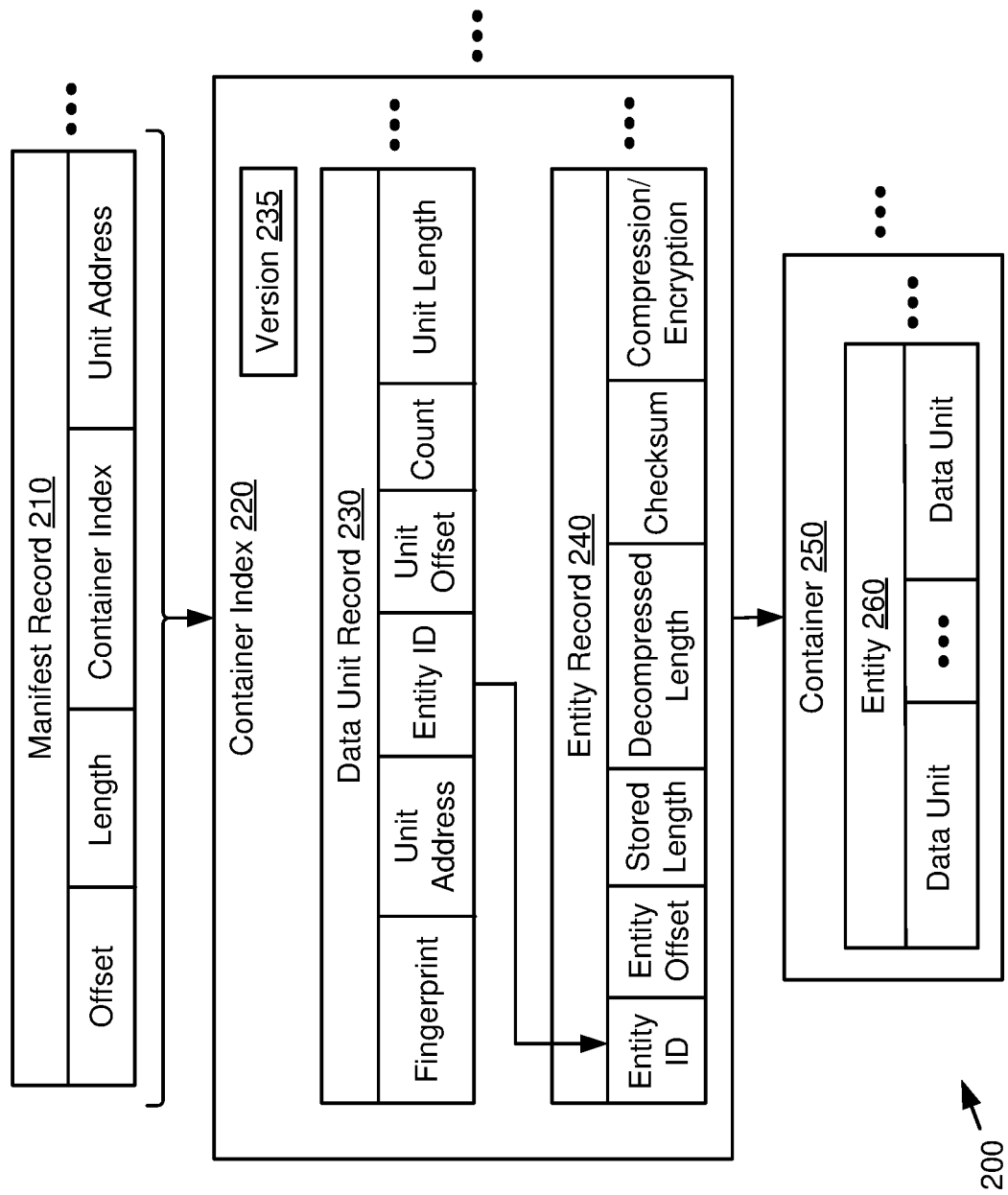
FIG. 2 is an illustration of example data structures, in accordance with some implementations.

Referring now to FIG. 2, shown is an illustration of example data structures 200 used in deduplication, in accordance with some implementations. As shown, the data structures 200 may include a manifest record 210, a container index 220, a container 250, and an entity 260. In some examples, the container index 220 and the container 250 may correspond generally to example implementations of the index 160 and the data container 170 (shown in FIG. 1), respectively. In some examples, the data structures 200 may be generated and/or managed by the storage controller 110 (shown in FIG. 1). Further, the data structures 200 may be used by the storage controller 110 to retrieve stored deduplicated data.

As shown in FIG. 2, in some examples, the manifest record 210 may have multiple fields including an offset field, a container index field, a length field, and a unit address field. In some implementations, the manifest record 210 may represent a range of data units in a run-length reference format. For example, to represent a range that begins at a first data unit and continues for N data units, the unit address field may indicate an arrival number of a first data unit in the range (i.e., the numerical order that the first data unit was added to the identified container index), and the length field may indicate the number of data units in the range that follow the first data unit within the container index.

In some implementations, each container index 220 may include any number of data unit record(s) 230 and entity record(s) 240. Each data unit record 230 may include various metadata fields, such as a fingerprint (e.g., a hash of the data unit), a unit address, an entity identifier, a unit offset (i.e., an offset of the data unit within the entity), a count value, and a unit length. Further, each entity record 240 may include various metadata fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In some implementations, each container index 220 may include a version number 235. The version number 235 may indicate a generation or relative age of the metadata in the container index. For example, the version number 235 may be compared to a version number of an associated journal (not shown in FIG. 2). If the version number 235 is greater than the version number of the associated journal, it may be determined that the container index 220 includes newer metadata than the associated journal.

3A. Example Data Structures During a Non-Cloning Operation

Figure 3A:
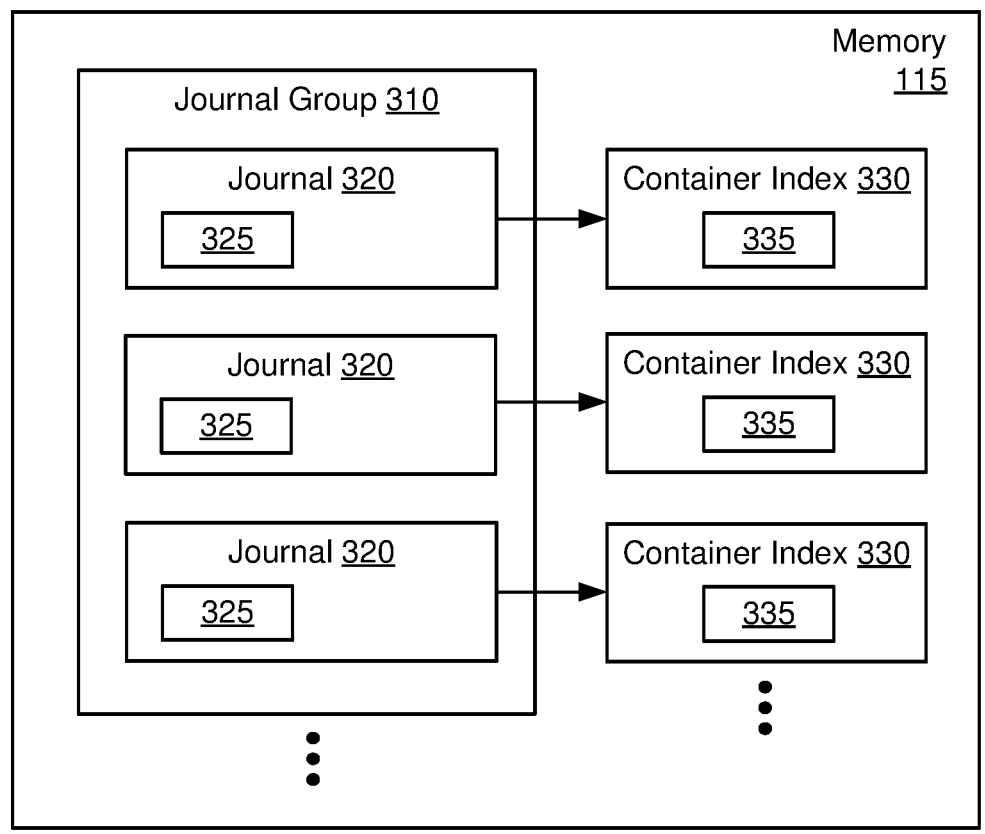
FIGS. 3A-3C are illustrations of example data structures, in accordance with some implementations.

Referring now to FIG. 3A, shown is an illustration of the memory 115 during a non-cloning operation (e.g., a read operation). As shown, during the non-cloning operation, the memory 115 may include multiple journals 320 in a journal group 310, and may also include multiple indexes 330. For example, a particular journal 320 and an associated index 330 may be loaded together into the memory in response to a detection of the non-cloning operation. In some examples, the journal group 310, journals 320, and indexes 330 may correspond generally to example implementations of the journal group 120, journals 130, and indexes 160 (shown in FIG. 1), respectively.

In some implementations, each journal 320 may be associated with a corresponding index 330, and may record changes to the metadata stored in the corresponding index 330. Further, for each journal group 120, all of the corresponding indexes 330 may be associated with a single stored object (e.g., a document, a database table, a data file, and so forth). For example, all of the corresponding indexes 330 may include metadata for data units included in a single file stored in a deduplication system (e.g., storage system 100 shown in FIG. 1).

In some implementations, each journal 320 may include or be associated with a version number 325. Further, each index 330 may include or be associated with a version number 335. In some implementations, during the non-cloning operation, the version number 325 may be compared to the version number 335 to determine whether the journal 320 or the associated index 330 reflects the latest version of metadata. For example, if the version number 325 is greater than the version number 335, it may be determined that the change data included in the journal 320 reflects a state of metadata that is more recent than the metadata stored in the index 330. If so, the index 330 may be updated to include the changes recorded in the journal 320. However, if the version number 325 is smaller than the version number 335, it may be determined that the change data included in the journal 320 reflects a state of metadata that is older than the metadata stored in the index 330. In this situation, the journal 320 may be cleared without updating the index 330.

3B-3C. Example Data Structures During a Cloning Operation

Figures 3B, 3C:
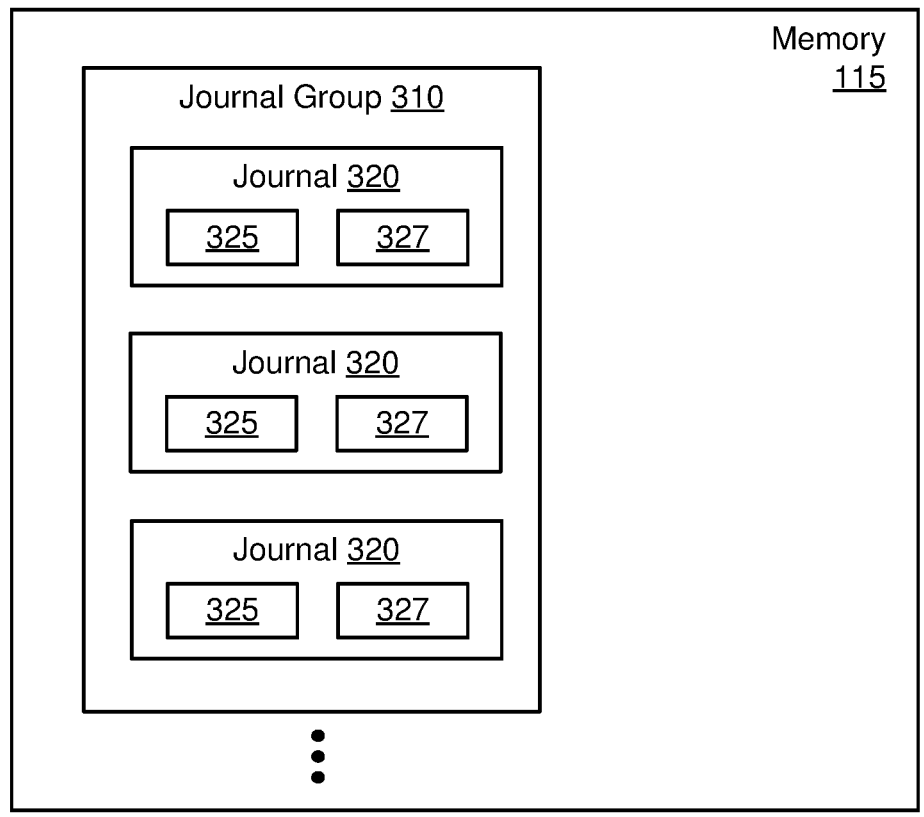

Referring now to FIGS. 3B-3C, shown are examples of data structures used during a cloning operation. As shown in FIG. 3A, during the cloning operation, the memory 115 may include multiple journals 320 in a journal group 310, but does not include the corresponding indexes 330 (shown in FIG. 3A). Further, each journal 320 may include a cloning data structure 327 that is dedicated for recording metadata changes during cloning operations.

In some implementations, performing a cloning operation of a source manifest (or a portion thereof) may include identifying the container index 330 associated with the manifest. The journal group 310 that includes the journal 320 corresponding to the identified container index 330 is loaded into memory 115 from persistent storage, but the container index 330 is not loaded into memory 115. In some implementations, the journal group 310 is loaded into memory as a whole unit. Performing the cloning operation includes generating a new cloned manifest that references the same data units that are referenced by the source manifest, and therefore results in increments to the reference counts of the cloned data units. In some implementations, the increments may be recorded in the cloning data structure 327 of the journal 320 loaded in memory 115.

Referring now to FIG. 3C, shown is an example implementation of the cloning data structure 327. As shown, the cloning data structure 327 may have multiple fields including a manifest identifier field, a unit address field, a length field, and a reference count field. The cloning data structure 327 may include multiple records or rows, with each record corresponding to a particular range in a cloned manifest. In some examples, the unit address and length fields of each record may identify the corresponding range in a run-length reference format. For example, the unit address field may indicate an arrival number of a first data unit in the range, and the length field may indicate the number of data units in the range that follow the first data unit. In some implementations, the reference count field may store or otherwise indicate a change to the reference count that occurred during a cloning operation. For example, when the cloning operation duplicates a particular range, the reference count field may indicate that the reference count for that range has been incremented by one. In some implementations, the reference count field may store a numerical value representing the total change to the reference count that occurred during one or more cloning operations.

In some implementations, in response to a triggering event, the data stored in the cloning data structure 327 of the journal 320 may be used to update the associated container index 330 (shown in FIG. 3A). This update may be referred to as "folding" the cloning data structure 327 into the container index 330. For example, when the journal 320 is full (e.g., the data stored in the journal 320 exceeds a maximum threshold), the container index 330 may be loaded into memory 115, and the reference counts in the container index 330 may be incremented to include the values in the reference count field of the corresponding records of the cloning data structure 327. When every record of the cloning data structure 327 has been folded into the container index 330, the entire cloning data structure 327 is cleared of the stored data (i.e., all rows are deleted).

In some implementations, when the cloning data structure 327 is folded into the container index 330, the container index 330 can also be updated based on changes in the journal 320 that are not included in the cloning data structure 327 (i.e., metadata changes that are not associated with cloning operations). In some implementations, the metadata changes that are not associated with cloning operations (also referred to as "non-cloning updates") may occur in the manner described above with reference to FIG. 3A. For example, a non-cloning update may include comparing the version number 325 of the journal 320 to the version number 335 of the container index 330, and performing the non-cloning update if the version number 325 is greater than the version number 335.

In some situations, a failure event (e.g., a power outage) may interrupt the folding of the container index 330 into the cloning data structure 327 before completion. After such interruptions, it may be difficult or impossible to determine which records of the cloning data structure 327 were already folded into the container index 330, and therefore the stored data may be lost or corrupted. In some implementations, the manifest identifier field may be used to recover the stored data after a failure event. For example, as each record of the cloning data structure 327 is folded into the container index 330, the manifest identifier field in that record of the cloning data structure 327 may be populated with an identifier of the clone manifest (i.e., the manifest generated by the cloning operation). Note that the manifest identifier field of a record remains empty until the folding of that record is completed. After a failure event, the manifest identifier field of each record may be analyzed. The presence of the identifier of the clone manifest in the manifest identifier field can indicate that the present record has already been folded into the container index, and therefore should not be folded again. Further, in some examples, each record that identifies the clone manifest in the manifest identifier field may be cleared from the journal 320.

4. Example Process

Figure 4:
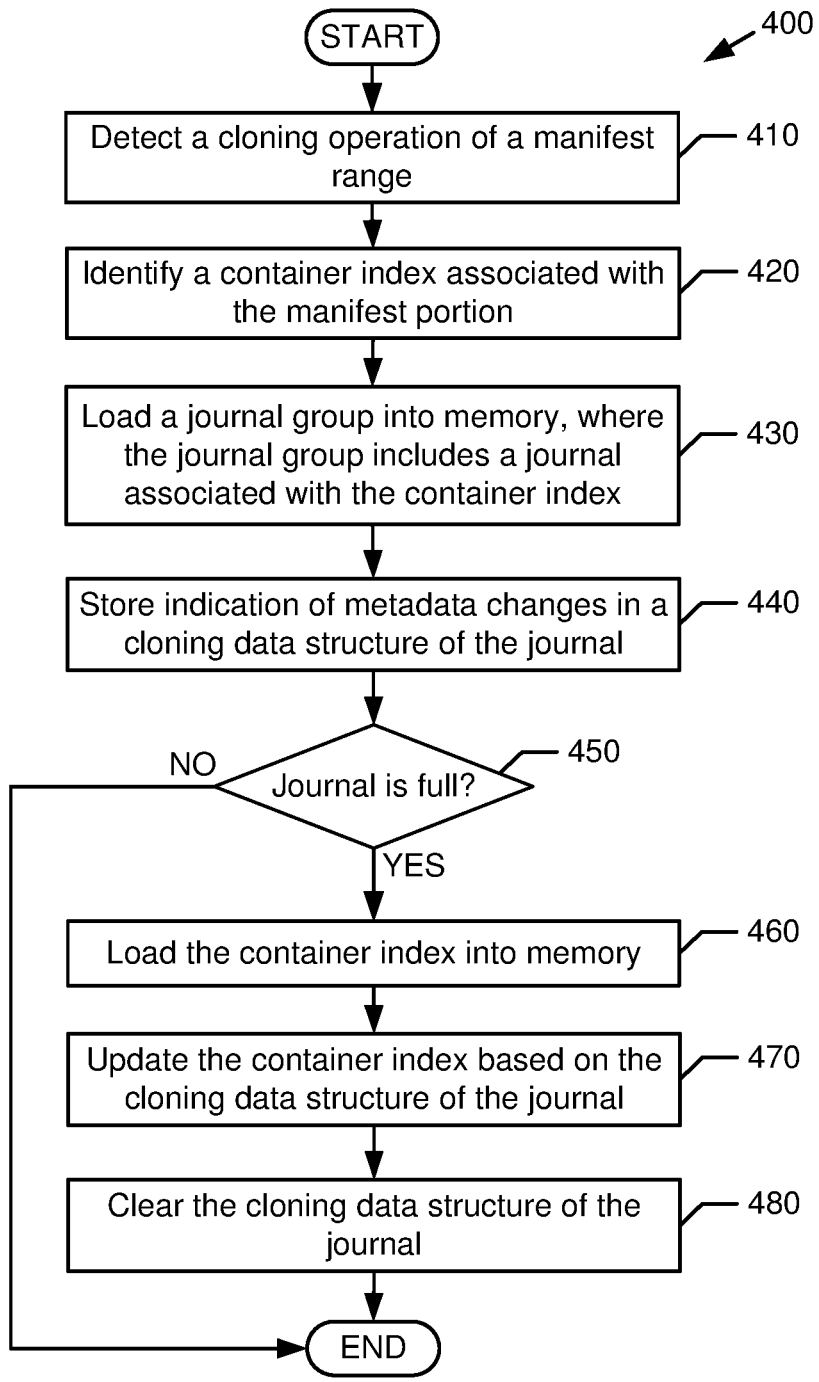
FIG. 4 is an illustration of an example process, in accordance with some implementations.

Referring now to FIG. 4, shown is an example process 400, in accordance with some implementations. In some examples, the process 400 may be performed by the storage controller 110 (shown in FIG. 1) during cloning operations. The process 400 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the processes 400-404 may be described below with reference to FIGS. 1-3C, which show examples in accordance with some implementations. However, other implementations are also possible.

Block 410 may include detecting a cloning operation of a manifest range. For example, referring to FIGS. 1-3C, the storage controller 110 may receive a request to clone a source manifest 150, and in response may initiate perform a cloning operation to create a clone manifest that duplicates a portion of the source manifest 150 at a particular point in time.

Block 420 may include identifying a container index associated with the manifest portion. Block 430 may include loading a journal group into memory, where the journal group includes a journal associated with the container index. For example, referring to FIGS. 1-3C, the storage controller 110 may identify the container index 160 associated with the source manifest 150, and can therefore identify the journal 320 that is associated with the identified container index 160. The storage controller 110 may then load the journal group 310 that includes the identified journal 320 into memory 115 from persistent storage 140. However, in some implementations, the storage controller 110 may not load the identified container index 160 into memory 115.

Block 440 may include storing an indication of metadata changes in a cloning data structure of the journal. For example, referring to FIGS. 1-3C, the storage controller 110 may generate a new cloned manifest that references the same data units that are referenced by the source manifest, and may determine the changes to the reference counts of the cloned data units. These changes may be recorded in the cloning data structure 327 of the journal 320 loaded in memory 115 (e.g., in a reference count field of a record associated with a cloned range).

Decision block 450 may include determining whether the journal is full. If it is determined that the journal is not full ("No" at block 450), then the process 400 may be completed. However, if it is determined that the journal is full ("Yes" at block 450), then the process 400 may continue at block 460, which may include loading the container index into memory. Block 470 may include updating the container index based on the cloning data structure of the journal. Block 480 may include clearing the cloning data structure of the journal. For example, referring to FIGS. 1-3C, the storage controller 110 may continue the cloning operation until it is completed. However, if it is determined that the journal 320 loaded in memory 115 has reached a maximum threshold of stored data, the associated container index 160 may be loaded into memory 115 from persistent storage 140. The data stored in the journal 320 may then be copied into the container index 160 in memory 115, and subsequently the data stored in the journal 320 may be deleted. After block 480, the process 400 may be completed.

In some examples, blocks 420-440 of process 400 can be repeated multiple times during a single cloning operation. For example, blocks 420-440 of process 400 may be performed for a sequence of container indexes that are associated with the manifest range being cloned.

5. Example Process

Figure 5:
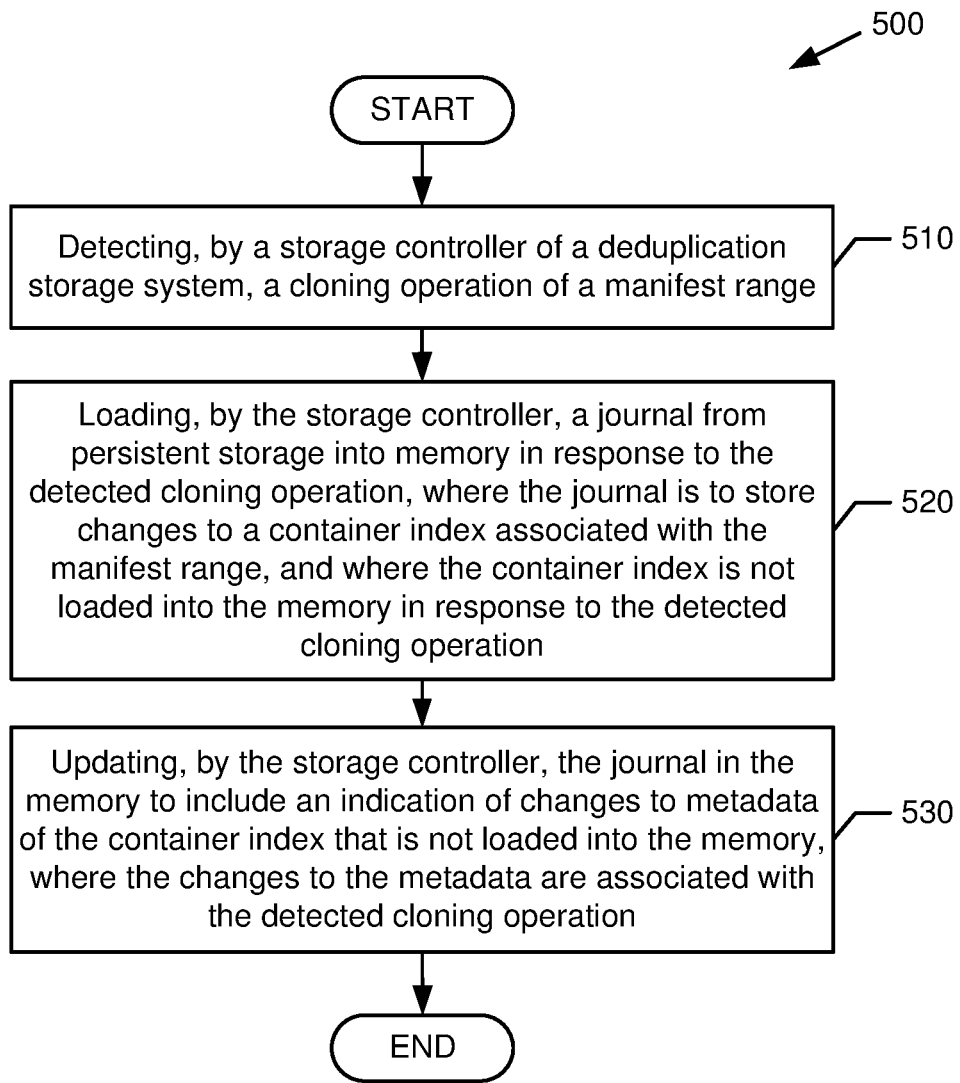
FIG. 5 is an illustration of an example process, in accordance with some implementations.

Referring now to FIG. 5, shown is an example process 500 in accordance with some implementations. In some examples, the process 500 may be performed using the storage controller 110 (shown in FIG. 1). The process 500 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth. For the sake of illustration, details of the process 500 may be described below with reference to FIGS. 1-3C, which show examples in accordance with some implementations. However, other implementations are also possible.

Block 510 may include detecting, by a storage controller of a deduplication storage system, a cloning operation of a manifest range. For example, referring to FIGS. 1-3C, the storage controller 110 may receive a request to clone a source manifest 150, and in response may initiate perform a cloning operation to create a clone manifest that duplicates a portion of the source manifest 150 at a particular point in time.

Block 520 may include loading, by the storage controller, a journal from persistent storage into memory in response to the detected cloning operation, where the journal is to store changes to a container index associated with the manifest range, and where the container index is not loaded into the memory in response to the detected cloning operation. For example, referring to FIGS. 1-3C, the storage controller 110 may identify the container index 160 associated with the source manifest 150, and may identify the journal 320 that is associated with that container index 160. The storage controller 110 can then identify the journal group 310 that includes the identified journal 320, and can then load the identified journal group 310 into memory 115 as a whole from persistent storage 140. However, the storage controller 110 may not load the container index 160 into memory 115 in response to the cloning operation.

Block 530 may include updating, by the storage controller, the journal in the memory to include an indication of changes to metadata of the container index, where the changes are associated with the detected cloning operation. For example, referring to FIGS. 1-3C, the storage controller 110 may generate a new cloned manifest that references the same data units that are referenced by the source manifest, and may determine the changes to the reference counts of the cloned data units. These changes may be recorded in the cloning data structure 327 of the journal 320 loaded in memory 115 (e.g., in a reference count field of a record associated with a cloned range).

6. Example Machine-Readable Medium

Figure 6:
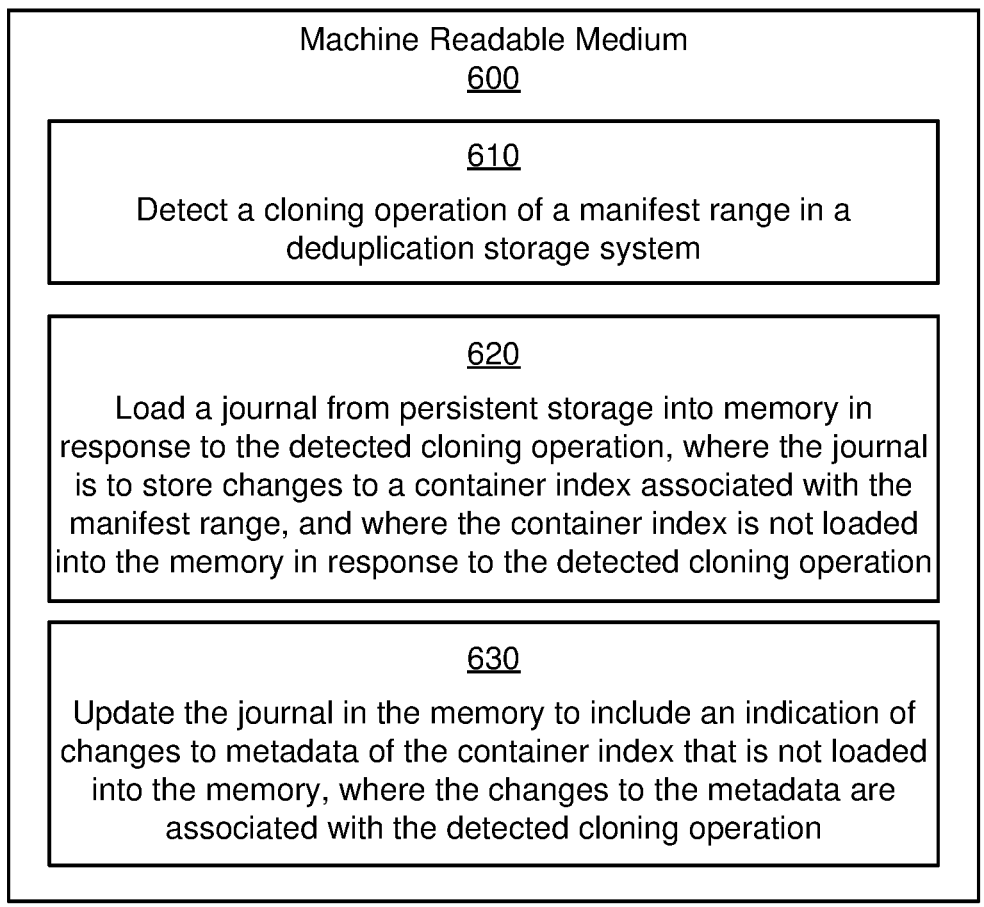
FIG. 6 is a diagram of an example machine-readable medium storing instructions in accordance with some implementations.

FIG. 6 shows a machine-readable medium 600 storing instructions 610-630, in accordance with some implementations. The instructions 610-630 can be executed by a single processor, multiple processors, a single processing engine, multiple processing engines, and so forth. The machine-readable medium 600 may be a non-transitory storage medium, such as an optical, semiconductor, or magnetic storage medium.

Instruction 610 may be executed to detect a cloning operation of a manifest range. Instruction 620 may be executed to load a journal from persistent storage into memory in response to the detected cloning operation, where the journal is to store changes to a container index associated with the manifest range, and where the container index is not loaded into the memory in response to the detected cloning operation. Instruction 630 may be executed to update the journal in the memory to include an indication of changes to metadata of the container index, where the changes are associated with the detected cloning operation.

7. Example Computing Device

Figure 7:
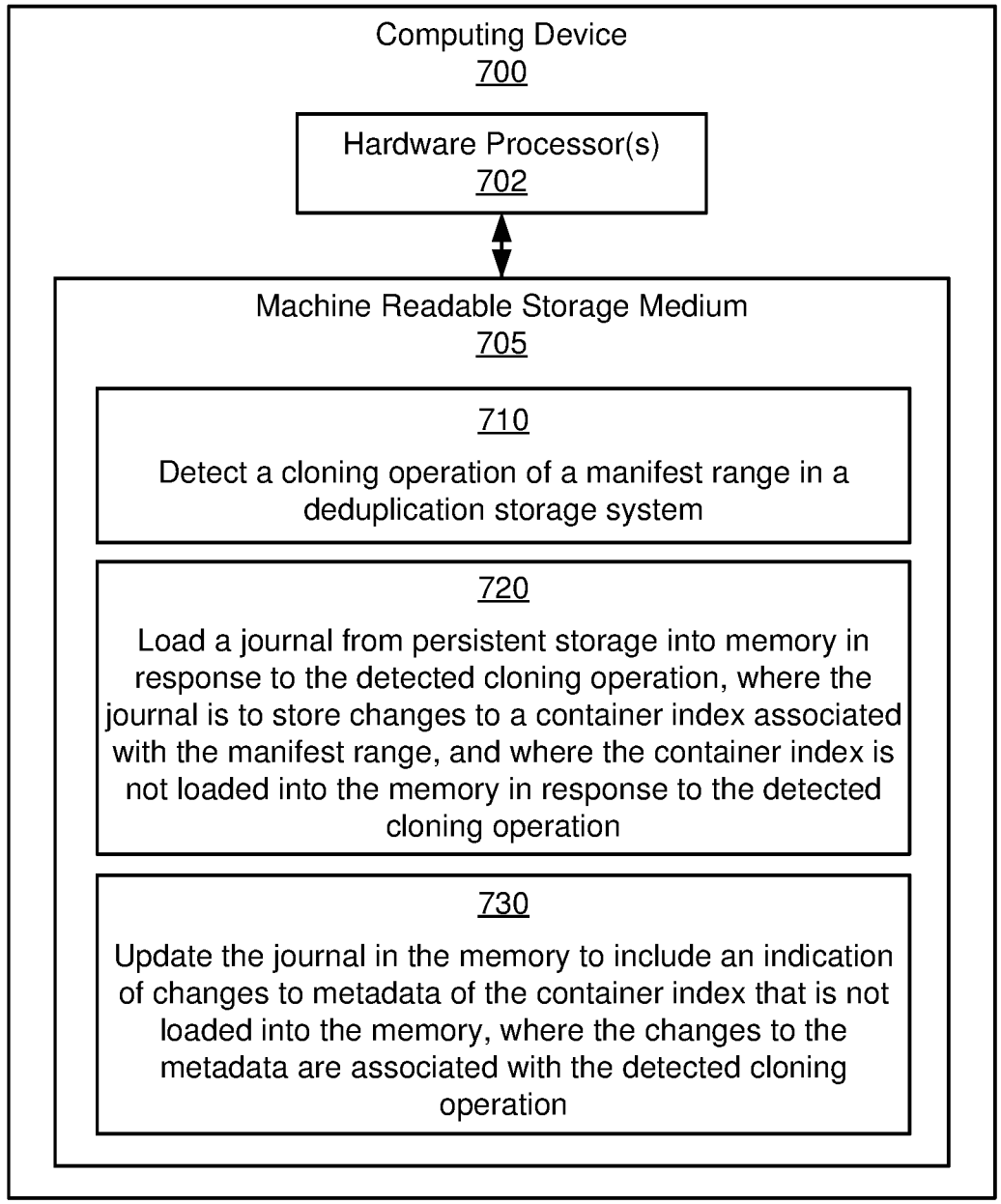
FIG. 7 is a schematic diagram of an example computing device, in accordance with some implementations.

FIG. 7 shows a schematic diagram of an example computing device 700. In some examples, the computing device 700 may correspond generally to some or all of the storage system 100 (shown in FIG. 1). As shown, the computing device 700 may include hardware processor 702 and machine-readable storage 705 including instructions 710-730. The machine-readable storage 705 may be a non-transitory medium. The instructions 710-730 may be executed by the hardware processor 702, or by a processing engine included in hardware processor 702.

Instruction 710 may be executed to detect a cloning operation of a manifest range. Instruction 720 may be executed to load a journal from persistent storage into memory in response to the detected cloning operation, where the journal is to store changes to a container index associated with the manifest range, and where the container index is not loaded into the memory in response to the detected cloning operation. Instruction 730 may be executed to update the journal in the memory to include an indication of changes to metadata of the container index, where the changes are associated with the detected cloning operation.

In accordance with implementations described herein, a deduplication storage system may perform a cloning operation by loading journals into memory, but not loading associated indexes into memory. Each journal may include a cloning data structure that is dedicated for recording or otherwise indicating metadata changes associated with cloning operations. The cloning data structure may accumulate these changes until a triggering event, and may be used to update the corresponding index during a single load into memory. In some examples, performing the cloning operation using journals may consume relatively less processing time and bandwidth than would be required if the associated indexes were loaded into memory. Accordingly, the disclosed technique for cloning operations may significantly improve the performance the deduplication storage system.

Note that, while FIGS. 1-7 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computer implemented method, comprising:
   detecting, by a storage controller of a deduplication storage system, a cloning operation of a manifest range;
   loading a journal from persistent storage into memory in response to the detected cloning operation, wherein the journal is to store changes to a container index associated with the manifest range, and wherein the container index is not loaded into the memory in response to the detected cloning operation; and
   updating the journal in the memory to include an indication of changes to metadata of the container index that is not loaded into the memory, wherein the changes to the metadata are associated with the detected cloning operation.

2. The computer implemented method of claim 1, comprising:
   detecting a non-cloning operation of a second manifest range;
   in response to detecting the non-cloning operation, loading a second journal and a second container index together into the memory from the persistent storage; and
   updating the second journal in the memory to store second changes associated with the second container index, wherein the second changes are associated with the non-cloning operation.

3. The computer implemented method of claim 1, wherein loading the journal into memory comprises:
   identifying the container index that is associated with the manifest range;
   identifying the journal based on the identified container index;
   identifying a journal group that includes the identified journal; and
   loading the identified journal group into the memory as a whole, wherein the identified journal group is a data structure to include a plurality of journals, and wherein each of the plurality of journals in the identified journal group is to record changes associated with a different container index.

4. The computer implemented method of claim 1, wherein updating the journal to include the indication of the changes to the metadata comprises:
   adding a record to a cloning data structure included in the journal, wherein the cloning data structure is to exclusive record indications of metadata changes during cloning operations.

5. The computer implemented method of claim 4, comprising:
   updating the record to include a unit address and a length value, wherein the unit address and a length value identify the manifest range in a run-length reference format.

6. The computer implemented method of claim 4, comprising:
   updating the record to include an indication of a reference count of the manifest range.

7. The computer implemented method of claim 4, comprising, in response to a determination that the journal in the memory has reached a maximum threshold of stored data:
   loading the container index into the memory from the persistent storage;
   updating the loaded container index in the memory based on the records of the cloning data structure; and
   after updating the loaded container index in the memory based on the records of the cloning data structure, clearing the records of the cloning data structure.

8. The computer implemented method of claim 7, comprising:
   for each record of the cloning data structure:
      updating the loaded container index in the memory based on the record; and
      after updating the loaded container index in the memory based on the record, updating the record to include an identifier of a manifest generated by the cloning operation.

9. A non-transitory machine-readable medium storing instructions that upon execution cause a processor to:
   detect a cloning operation of a manifest range;
   load a journal from persistent storage into memory in response to the detected cloning operation, wherein the journal is to store changes to a container index associated with the manifest range, and wherein the container index is not loaded into the memory in response to the detected cloning operation; and
   update the journal in the memory to include an indication of changes to metadata of the container index that is not loaded into the memory, wherein the changes to the metadata are associated with the detected cloning operation.

10. The non-transitory machine-readable medium of claim 9, including instructions that upon execution cause the processor to:
    identify the container index that is associated with the manifest range;
    identify the journal based on the identified container index;
    identify a journal group that includes the identified journal; and
    load the identified journal group into the memory as a whole, wherein the journal group is a data structure to include a plurality of journals, and wherein each of the plurality of journals in the journal group is to record changes associated with a different container index.

11. The non-transitory machine-readable medium of claim 9, including instructions that upon execution cause the processor to:
    add a record to a cloning data structure included in the journal, wherein the cloning data structure is to exclusive record indications of metadata changes during cloning operations.

12. The non-transitory machine-readable medium of claim 11, including instructions that upon execution cause the processor to:
    update the record to include a unit address and a length value, wherein the unit address and a length value identify the manifest range in a run-length reference format.

13. The non-transitory machine-readable medium of claim 11, including instructions that upon execution cause the processor to:
    detect a non-cloning operation of a second manifest range;
    in response to the detected non-cloning operation, load a second journal and a second container index together into the memory from the persistent storage; and
    update the second journal in the memory to store second changes associated with the second container index, wherein the second changes are associated with the detected non-cloning operation.

14. The non-transitory machine-readable medium of claim 11, including instructions that upon execution cause the processor to:

in response to a determination that the journal in the memory has reached a maximum threshold of stored data:

load the container index into the memory from the persistent storage;

update the loaded container index in the memory based on the records of the cloning data structure; and after updating the loaded container index in the memory based on the records of the cloning data structure, clear the records of the cloning data structure.

15. A storage system comprising:

a processor comprising a plurality of processing engines; and a machine-readable storage storing instructions, the instructions executable by the processor to:

detect a cloning operation of a manifest range;

load a journal from persistent storage into memory in response to the detected cloning operation, wherein the journal is to store changes to a container index associated with the manifest range, and wherein the container index is not loaded into the memory in response to the detected cloning operation; and update the journal in the memory to include an indication of changes to metadata of the container index that is not loaded into the memory, wherein the changes to the metadata are associated with the detected cloning operation.

16. The storage system of claim 15, including instructions executable by the processor to:

identify the container index that is associated with the manifest range;

identify the journal based on the identified container index;

identify a journal group that includes the identified journal; and load the identified journal group into the memory as a whole, wherein the journal group is a data structure to include a plurality of journals, and wherein each of the plurality of journals in the journal group is to record changes associated with a different container index.

17. The storage system of claim 15, including instructions executable by the processor to:

add a record to a cloning data structure included in the journal, wherein the cloning data structure is to exclusive record indications of metadata changes during cloning operations.

18. The storage system of claim 17, including instructions executable by the processor to:

update the record to include a unit address and a length value, wherein the unit address and a length value identify the manifest range in a run-length reference format.

19. The storage system of claim 17, including instructions executable by the processor to:

update the record to include an indication of a reference count of the manifest range.

20. The storage system of claim 15, including instructions executable by the processor to:

in response to a determination that the journal in the memory has reached a maximum threshold of stored data:

load the container index into the memory from the persistent storage;

update the loaded container index in the memory based on the records of the cloning data structure; and after updating the loaded container index in the memory based on the records of the cloning data structure, clear the records of the cloning data structure.

* * * * *